J. HAUENSTEIN.
COOKING UTENSIL ATTACHMENT.
APPLICATION FILED APR. 24, 1917.
1,239,788.
Patented Sept. 11, 1917.
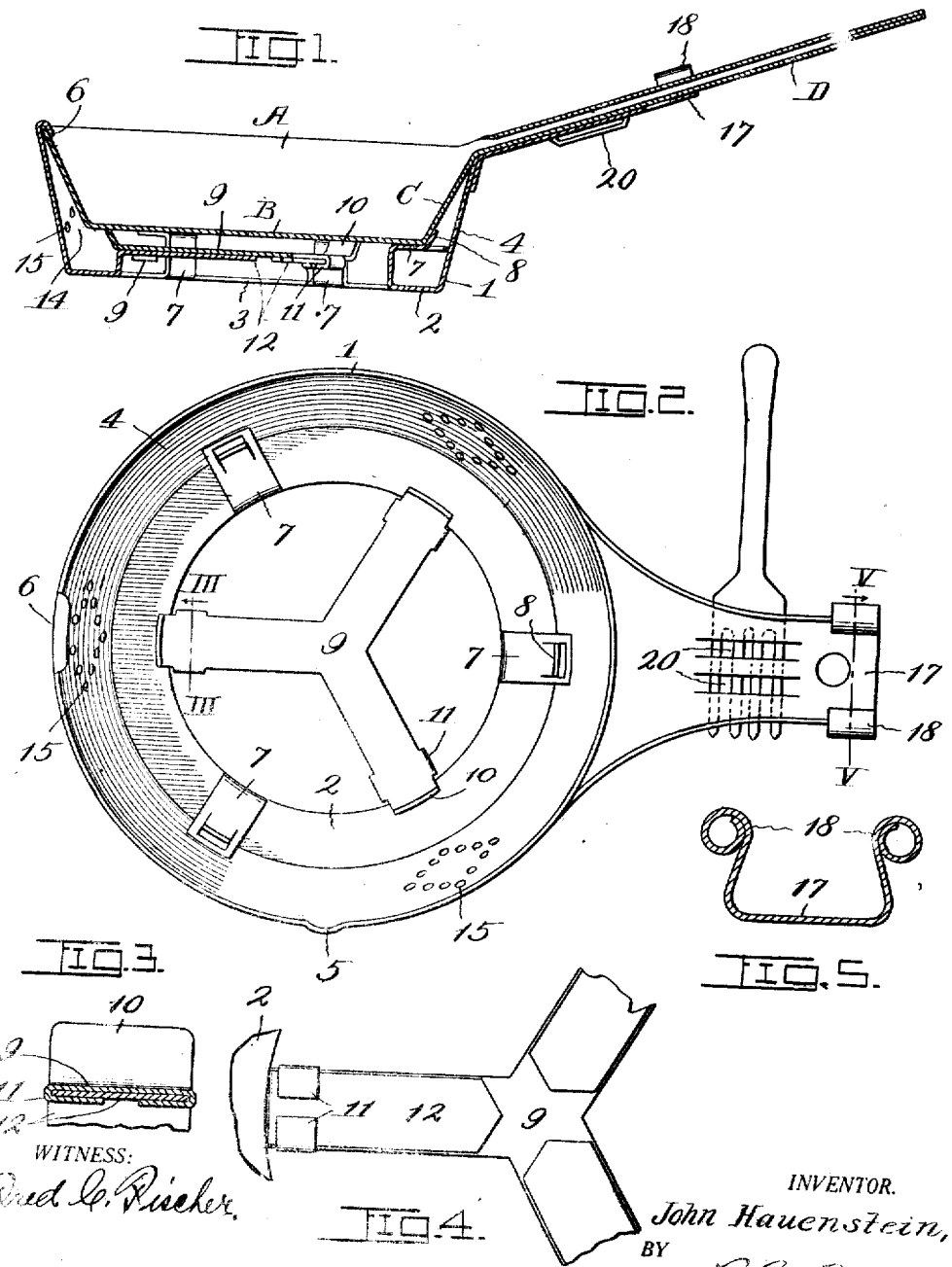
INVENTOR.
John Hauenstein,
BY
ATTORNEY.

UNITED STATES PATENT OFFICE.

JOHN HAUENSTEIN, OF KANSAS CITY, MISSOURI, ASSIGNOR OF ONE-FOURTH TO THOMAS E. LANDER, OF KANSAS CITY, MISSOURI.

COOKING-UTENSIL ATTACHMENT.

1,239,788.

Specification of Letters Patent. Patented Sept. 11, 1917.

Application filed April 24, 1917. Serial No. 164,099.

*To all whom it may concern:*

Be it known that I, JOHN HAUENSTEIN, a citizen of the United States, residing at Kansas City, in the county of Jackson and State of Missouri, have invented certain new and useful Improvements in Cooking-Utensil Attachments, of which the following is a specification.

My invention relates to cooking utensil attachments, and one object is to provide a new and useful device of this character whereby the heat arising from a gas or other stove is concentrated about the bottom and sides of the cooking utensil, to the end that the cooking process is expedited with a resultant saving in fuel.

A further object is to provide a device having a broader bottom than the cooking utensil supported thereby, so that said cooking utensil is not likely to upset while in use upon a stove.

Another object is to provide a device of this character having a bridge member for supporting cooking utensils of different diameters.

Other objects will hereinafter appear and in order that the invention may be fully understood, reference will now be made to the accompanying drawing, in which:

Figure 1 is a vertical sectional view showing a frying pan with my attachment applied thereto.

Fig. 2 is a plan view of the attachment removed from the frying pan.

Fig. 3 is a cross section on line III—III of Fig. 2.

Fig. 4 is a broken inverted plan view of the bridge member.

Fig. 5 is a cross section, enlarged, on line V—V of Fig. 2.

A designates a frying pan of usual construction.

1 designates my device, which embodies a bottom 2 having a large, central opening 3 therein and surrounded by an upwardly and outwardly flaring wall 4.

The wall 4 is provided at one side with a spout 5 to receive the usual spout of the frying pan, and provided at its front side with a downturned lip 6 for engagement over the upper edge of the body of the frying pan A, which is held above the bottom 2 of the utensil by a plurality of radial supporting members 7, which extend upwardly and outwardly to engage the bottom B of the frying pan and the circular wall 4 of the utensil, as disclosed by Fig. 1. The supporting members 7 are provided near their outer terminals with upturned fingers 8 to engage the lower portion of the surrounding wall C of the frying pan to assist the lip 6 and a clamp hereinafter referred to in securing said frying pan from independent lateral movement.

9 designates a bridge having upturned members 10, the upper edges of which are on a level with the upper surface of the supporting members 7 to coact therewith in supporting the frying pan A. The principal object of the bridge 9 is to support utensils which are too small in diameter to rest upon the supporting members 7. For instance, if water or other fluid is to be heated in a tin cup, said cup may be set upon the bridge member 9 and have its contents quickly heated to the desired temperature by the flame passing upward through the opening 3 in the bottom of the utensil. The bridge 9 may be secured in various ways, but owing to the heat to which it is subjected I prefer to dispense with the use of solder and secure said bridge in place by integral clamps 11 and straps 12 which latter are struck from the bottom 2 and firmly embraced by said clamps 11.

The diameter of the bottom 2 is greater than that of the bottom B of the frying pan for the purpose of providing a broad support and leaving an annular space 14, closed at its upper portion by the upper margin of the wall 4 snugly embracing the upper portion of the wall C of said frying pan. Perforations 15 are formed in the upper portion of the wall 4 for the egress of hot air as it circulates upwardly from the stove through the opening 3 and the annular space 14.

The wall 4 is provided at its rear side with a rigid handle 17 adapted to fit against the underside of the frying pan handle D and provided with a resilient clamp 18 adapted to grip the handle D and coact with the lip 6 in securing the attachment to the frying pan. The handle 17 has a plurality of loops 20 struck therefrom for holding a fork or spoon, which may be used from time to time in stirring vegetables or turning meats being cooked in the frying pan.

From the above description, it is apparent that the hot air and flame arising from the stove circulate upwardly through the opening 3 and around the body of the frying pan A, after which the hot air escapes through the perforations 15. Thus the hot air is very effective in heating the frying pan, and the flame such as arises from a gas stove is prevented from blowing about and possibly igniting the grease in the frying pan or the clothes of the cook overseeing the cooking process.

While the attachment may be made of any suitable material I prefer to stamp it from sheet metal as it can then be produced in large quantities at a very low price.

While I have shown the device applied to a frying pan it is apparent that by making the wall 3 higher it may be applied equally as well to stew pans and other cooking utensils having a rigid handle projected from one side thereof, so that the device can be readily held in place through the intermediacy of the lip 6 and the clamp 18.

Having thus described my invention, what I claim and desire to secure by Letters Patent, is:

1. In combination with a cooking utensil having a body portion with a handle projecting rigidly therefrom, an attachment consisting of a bottom having an opening therein, supporting members extending upwardly from said bottom to support the cooking utensil above said bottom, a wall surrounding said bottom and extending upwardly therefrom, means on said wall to removably secure it to the body of the cooking utensil, a handle projecting rigidly from said wall and adapted to underlie the utensil handle, and means on the attachment handle for removably-securing it to the utensil handle.

2. In combination with a cooking utensil having a body portion with a handle projecting rigidly therefrom, an attachment consisting of a bottom having an opening therein, supporting members extending upwardly from said bottom to support the cooking utensil above said bottom, a wall surrounding said bottom and extending upwardly therefrom, said wall having perforations therein and having its upper margin to snugly fit the upper portion of the utensil body and its lower portion spaced from said utensil body, a lip on said wall to removably-secure it to the body of the cooking utensil, a handle projecting rigidly from said wall and adapted to underlie the utensil handle, and means on the attachment handle for removably-securing it to the utensil handle.

3. An attachment of the character described, consisting of a bottom portion having an opening therein, means extending upwardly from said bottom portion to support a cooking utensil provided with a handle, a wall surrounding said bottom portion and extending upwardly therefrom, means on said wall adapted to overlap the upper edge of the cooking utensil, a handle projecting rigidly from said wall, and a resilient clamp on said handle adapted to engage the cooking utensil handle.

4. An attachment of the character described, consisting of a bottom portion having an opening therein, means extending upwardly from said bottom portion to support a cooking utensil provided with a handle, a wall surrounding said bottom portion and extending upwardly therefrom, a lip on said wall adapted to overlap the upper edge of the cooking utensil, a handle projecting rigidly from said wall, and means on said handle for engaging the cooking utensil handle.

5. An attachment of the character described, consisting of a bottom portion having an opening therein, strips struck from said bottom portion and extending upwardly therefrom, a bridge secured to said strips, a wall surrounding said bottom portion and extending upwardly therefrom, a handle projecting from said wall, supporting members extending upwardly from the margin of the bottom opening and outwardly against said surrounding wall, and fingers projecting upwardly from said supporting members, substantially as shown and described.

In testimony whereof I affix my signature, in the presence of two witnesses.

JOHN HAUENSTEIN.

Witnesses:
F. G. Fischer,
L. J. Fischer.